(12) United States Patent
Dunsch et al.

(10) Patent No.: US 6,607,346 B2
(45) Date of Patent: Aug. 19, 2003

(54) SPARE WHEEL HOLDING DEVICE

(75) Inventors: Juergen Dunsch, Leonberg (DE);
Joerg Riehle, Stuttgart (DE); Hans Riehle, Ludwigsburg (DE)

(73) Assignee: ORIS Fahrzeugteile Hans Riehle GmbH, Moeglingen (DE)

( * ) Notice: Subject to any disclaimer, the term of this patent is extended or adjusted under 35 U.S.C. 154(b) by 0 days.

(21) Appl. No.: 09/779,406

(22) Filed: Feb. 8, 2001

(65) Prior Publication Data
US 2002/0017543 A1 Feb. 14, 2002

(30) Foreign Application Priority Data
Feb. 10, 2000 (DE) .......................... 100 05 767

(51) Int. Cl.[7] .............................. B62D 43/02
(52) U.S. Cl. ................. 414/466; 224/489; 224/502; 224/503
(58) Field of Search ................. 414/463, 465, 414/466; 224/489, 492, 502, 503, 512

(56) References Cited
U.S. PATENT DOCUMENTS

| 3,753,520 | A | * | 8/1973 | Bodde | 224/42.21 |
|---|---|---|---|---|---|
| 3,804,308 | A | * | 4/1974 | Bodde | 224/42.21 |
| 3,822,814 | A | * | 7/1974 | Baldi | 224/502 |
| 3,845,891 | A | * | 11/1974 | Becher | 414/465 |
| 4,561,575 | A | * | 12/1985 | Jones | 224/503 |
| 4,679,717 | A | * | 7/1987 | Hansen | 224/512 |
| 4,817,834 | A | * | 4/1989 | Weiler | 224/512 |
| 5,104,015 | A | * | 4/1992 | Johnson | 224/503 |
| 5,186,371 | A | * | 2/1993 | Jozefczak et al. | 414/463 |
| 5,564,611 | A | * | 10/1996 | Weiler | 224/502 |
| 5,791,533 | A | * | 8/1998 | Neag et al. | 224/509 |
| 5,806,736 | A | * | 9/1998 | Kincart | 224/509 |
| 6,189,748 | B1 | * | 2/2001 | Hutter et al. | 414/465 |

FOREIGN PATENT DOCUMENTS

GB              194053          3/1923

* cited by examiner

Primary Examiner—Kathy Matecki
Assistant Examiner—Sang Kim
(74) Attorney, Agent, or Firm—Barry R. Lipsitz; Douglas M. McAllister

(57) ABSTRACT

A swivelling spare wheel carrier for a vehicle is provided which improves rear access to the vehicle body and the tailgate opening. The spare wheel carrier is connected to the vehicle body by a swivel joint. A swivelling axis of the swivel joint is disposed such that, by means of the spare wheel carrier, the spare wheel is movable from a travel position, in which it is behind the tailgate, into a rear access position, in which the spare wheel held by the spare wheel carrier is disposed at least in part with a region overlapping a rear part of a longitudinal side of the vehicle body.

18 Claims, 6 Drawing Sheets

SPARE WHEEL HOLDING DEVICE

BACKGROUND OF THE INVENTION

The invention relates to a spare wheel holding device for a vehicle body having a tailgate, comprising a spare wheel carrier, which holds a spare wheel and is capable of swivelling about an axis relative to the vehicle body. For purposes of the present disclosure, the term "tailgate" is intended to encompass any door on the back end (i.e., tail end) of a vehicle.

Such spare wheel carriers are known in so far as they are mounted by means of two swivel joints on the vehicle body, e.g. close to the fittings for the tailgate.

With such a spare wheel holding device, opening of the tailgate for loading purposes is problematical.

Such a spare wheel holding device moreover additionally requires the special provision of seats for the swivel bearings on the vehicle body.

The object of the invention is therefore to improve a spare wheel holding device of the generic type in a way that improves rear access to the vehicle body and hence to the tailgate and enables said device to be fixed as easily as possible to the vehicle body.

SUMMARY OF THE INVENTION

In a spare wheel holding device of the type described initially said object is achieved according to the invention in that the spare wheel carrier is connected to the vehicle body by a swivel joint, the swivelling axis of which is disposed in such a way that, by means of the spare wheel carrier, the spare wheel is movable from a travel position, in which it is behind the tailgate, into a rear access position, in which the spare wheel held by the spare wheel carrier is disposed at least with a part-region overlapping a rear part of a longitudinal side of the vehicle body, i.e. the part-region of the spare wheel extends in a forward direction from the tail of the vehicle body and, in so doing, overlaps the longitudinal side.

The advantage of the solution according to the invention is that it improves rear access to the vehicle body because the spare wheel in the rear access position, owing to the fact that at least a part-region of the spare wheel overlaps a rear part of the longitudinal side of the vehicle body, projects to a lesser extent back beyond the tail of the vehicle body than the solutions known from prior art.

The spare wheel is in said case preferably positioned approximately parallel to the longitudinal side of the vehicle body.

As an alternative or in addition to the previously described solutions, the object according to the invention is however also achieved in that the spare wheel carrier is mounted by means of a single swivel bearing so as to be capable of swivelling relative to the vehicle body.

Provision of a single swivel bearing allows the mounting of the spare wheel carrier on the vehicle body to be substantially simplified.

In principle, the swivel bearing may be designed in such a way that it allows swivelling about a plurality of axes or also optionally provides, in addition to the swivelling, a translational motion.

In this case it is particularly advantageous if the spare wheel carrier is mounted in the swivel bearing so as to be capable of swivelling only about a single swivelling axis, thereby selecting for the spare wheel carrier a defined swivelling motion about the swivelling axis and hence enabling easy horizontal swinging from the travel position into the rear access position.

As an alternative or in addition to the previously described solutions, the object according to the invention is however also achieved in that the swivel bearing is disposed below the upper edge of a bumper unit.

Such an arrangement of the swivel bearing below an upper edge of the bumper unit, i.e. between the upper edge of the bumper unit and the road surface, has the great advantage of making it possible to realize a far simpler and far more stable arrangement of the swivel bearing than is the case with the prior art, in which the swivel bearing is always disposed above the upper edge of the bumper unit.

In particular, a further result of arranging the swivel bearing below an upper edge of the bumper unit is that opening of the tailgate may be effected totally uninfluenced by the swivel bearing and, what is more, the vehicle body above the upper edge of the bumper unit does not require any additional stabilising elements capable of holding the swivel bearing for the spare wheel carrier.

One form of realizing the arrangement of the swivel bearing provides, for example, that the swivel bearing is integrated in the bumper unit.

Alternatively, it is however also conceivable for the swivel bearing to be seated below a lower edge of the bumper unit. Said arrangement has the great advantage of allowing the bumper unit to be constructed totally separate from the swivel bearing and hence eliminating the need to modify the bumper unit itself in the event of add-on of the spare wheel holding device according to the invention.

As an alternative or in addition to the previously described embodiments, a particularly advantageous solution provides that the swivel bearing is connected to the vehicle body by a holding device provided for the bumper unit. Said solution has the advantage that, on account of the fact that the bumper unit is usually removable anyway, the swivel bearing may easily be mounted using the assembly points provided for the bumper on the vehicle body.

A particularly advantageous solution in said case provides that the swivel bearing is connected to a bumper bracket of the vehicle body.

Since the bumper brackets of the vehicle body are usually not of such a stable construction that high bending moments may be transmitted via them, it is preferably provided that both bumper brackets are connected to one another by a strut and that the swivel bearing is stabilized relative to the vehicle body by means of the strut and the two bumper brackets.

In the previous description of the individual embodiments no detailed information has been given about the movement of the spare wheel relative to the road surface during the transition from the travel position to the rear access position.

It might therefore be possible, for example, to design the movement in such a way that the spare wheel moves substantially at the same distance above the road surface.

A particularly advantageous solution however provides that the swivel bearing is designed in such a way that the spare wheel in the rear access position is disposed at a greater distance from the road surface than in the travel position.

In said case the swivel bearing might be designed, for example, in such a way that the distance of the spare wheel from the road surface during the transition from the travel position to the rear access position initially increases, then passes through a maximum value and finally in the rear access position has a value which is lower than the maximum value, thereby achieving for the spare wheel in the rear access position a dead centre position, which automatically guarantees that the rear access position is maintained.

Alternatively, it is however also conceivable for the spare wheel, as it moves from the travel position to the rear access position, to be continuously lifted relative to the road surface.

A fixing device is preferably to be provided, by means of which the spare wheel and the spare wheel carrier are fixable in the rear access position.

Alternatively or additionally a further—according to the invention—preferred form of movement of the spare wheel carrier provides that the latter in the rear access position is at a distance from the longitudinal side of the vehicle body corresponding at most to approximately the distance of the spare wheel carrier from the tail of the vehicle body in the travel position.

As yet, no detailed information has been provided about the construction of the swivel bearing in a situation of the type where the distance of the spare wheel from the road surface changes. A particularly advantageous solution therefore provides that the swivel bearing has a swivelling axis, which extends obliquely relative to the vertical longitudinal centre plane of the vehicle.

Said swivelling axis is preferably directed in such a way that it includes an acute angle together with a vertical.

It is further preferably provided that the swivelling axis includes an acute angle together with a horizontal extending at right angles to the vertical longitudinal centre plane of the vehicle.

It is moreover advantageous when the swivelling axis includes an acute angle together with a horizontal extending parallel to the vertical longitudinal centre plane of the vehicle.

As regards the construction of the spare wheel carrier, as yet no detailed information has been specifically provided. An advantageous solution therefore provides that the spare wheel carrier at one side has a bearing arm leading to the swivel bearing.

By said means the spare wheel carrier may easily be designed in such a way that the spare wheel in the travel position is preferably disposed centrally relative to the vehicle body.

It is however also conceivable for the spare wheel carrier in the travel position to be disposed off-centre relative to the vehicle body.

A particularly advantageous fixing of the spare wheel carrier in the travel position is possible when the spare wheel carrier at an opposite side to the bearing arm has a fixing arm for fixing to the vehicle body in the travel position.

By said means the spare wheel carrier may advantageously be fixed at substantially mutually opposing sides in a stable manner in the travel position relative to the vehicle body.

As regards the course of the fixing arm, as yet no detailed information has been provided either. Particularly when the distance of the spare wheel from the road surface changes during the transition from the travel position to the rear access position, it is therefore preferably also provided that in the rear access position the fixing arm is at a greater distance from the road surface than in the travel position.

As yet no specific information has been provided about the fixing of the spare wheel carrier in the travel position. A particularly advantageous solution therefore provides that a fixing device is disposed below an upper edge of the bumper unit. Such an arrangement of the fixing device likewise has the advantage of enabling construction of the vehicle body above the bumper unit without special reinforcements for the fixing device.

In said case it is particularly advantageous when the fixing device is disposed in the region of the bumper unit or is disposed below a lower edge of the bumper unit.

Said fixing device preferably comprises a fixing seat, which is disposed in a fixed manner on the vehicle body, and a fixing element, which is held on the spare wheel carrier, preferably on the fixing arm of the latter.

As regards the connection between the fixing seat and the vehicle body, it is particularly advantageous when the fixing seat is connected to the vehicle body by a holding device provided for the bumper unit, so that the fixing seat also may likewise be easily retrofitted on the vehicle body.

A particularly advantageous solution in said case provides that the fixing seat is connected to a bumper bracket.

It is even more advantageous when the fixing seat is connected to both bumper brackets by a strut.

Further features and advantages of the invention are the subject matter of the following description and of the diagrammatic illustration of several embodiments.

DETAILED DESCRIPTION OF THE INVENTION

Figure 1:
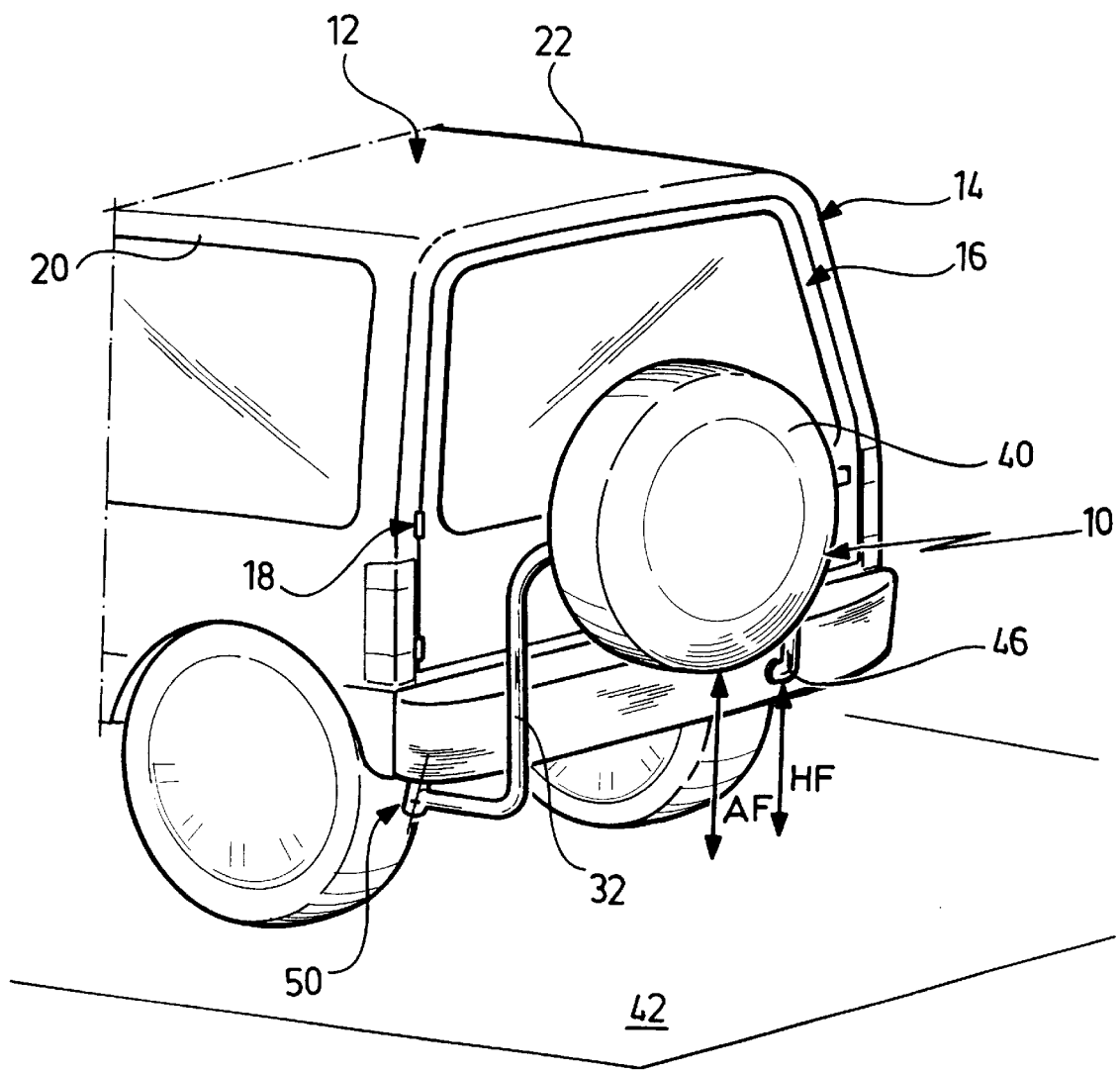
FIG. 1 diagrammatic cut-out view of a first embodiment of a spare wheel holding device according to the invention in connection with a partially illustrated vehicle body, wherein the spare wheel carrier and the spare wheel are in the travel position.
Figure 2:
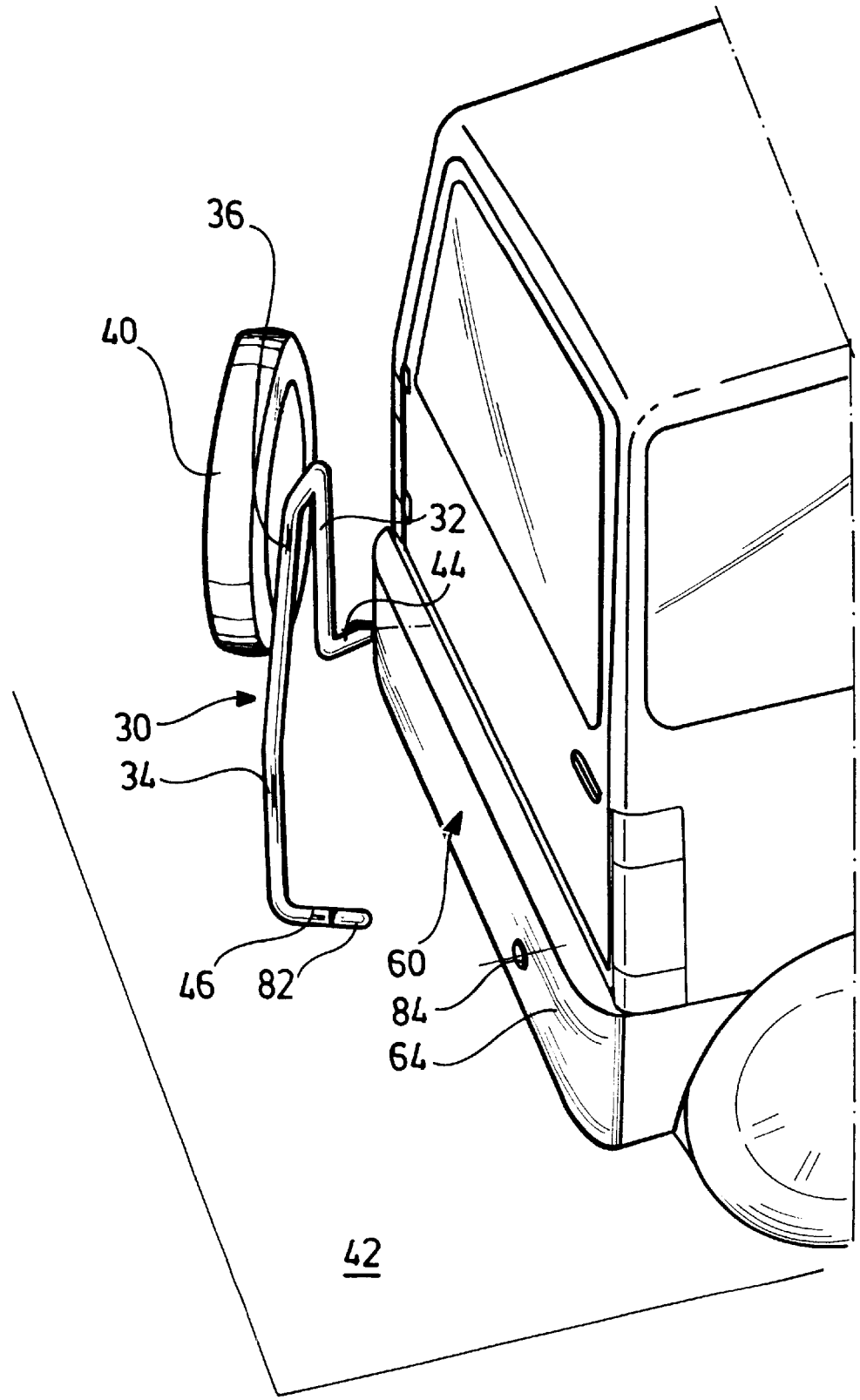
FIG. 2 view similar to FIG. 1, wherein the spare wheel carrier and the spare wheel have been swivelled out of the travel position.

The spare wheel holding device 10 is mounted on a vehicle body denoted as a whole by 12 in the region of a tail 14, wherein the tail 14 is provided with a tailgate 16, which e.g. by means of hinges 18 is capable of swinging towards one side of the body, e.g. in the direction of a longitudinal side 20 of two opposite longitudinal sides 20 and 22. The tailgate 16 may however alternatively be capable of swivelling upwards.

The spare wheel holding device 10 according to the invention comprises a spare wheel carrier 30, which is formed by an inverted U-shaped bow having two lateral limbs 32 and 34 and a middle limb 36, wherein a spare wheel 40 is held preferably on the middle limb 36, while the lateral limbs 32 and 34 extend in the direction of a road surface 42.

A bearing arm denoted as a whole by 44 is held on one of the lateral limbs 32, 34, e.g. on the lateral limb 32, while a fixing arm denoted as a whole by 46 is held on the other lateral limb 34.

Figure 5:
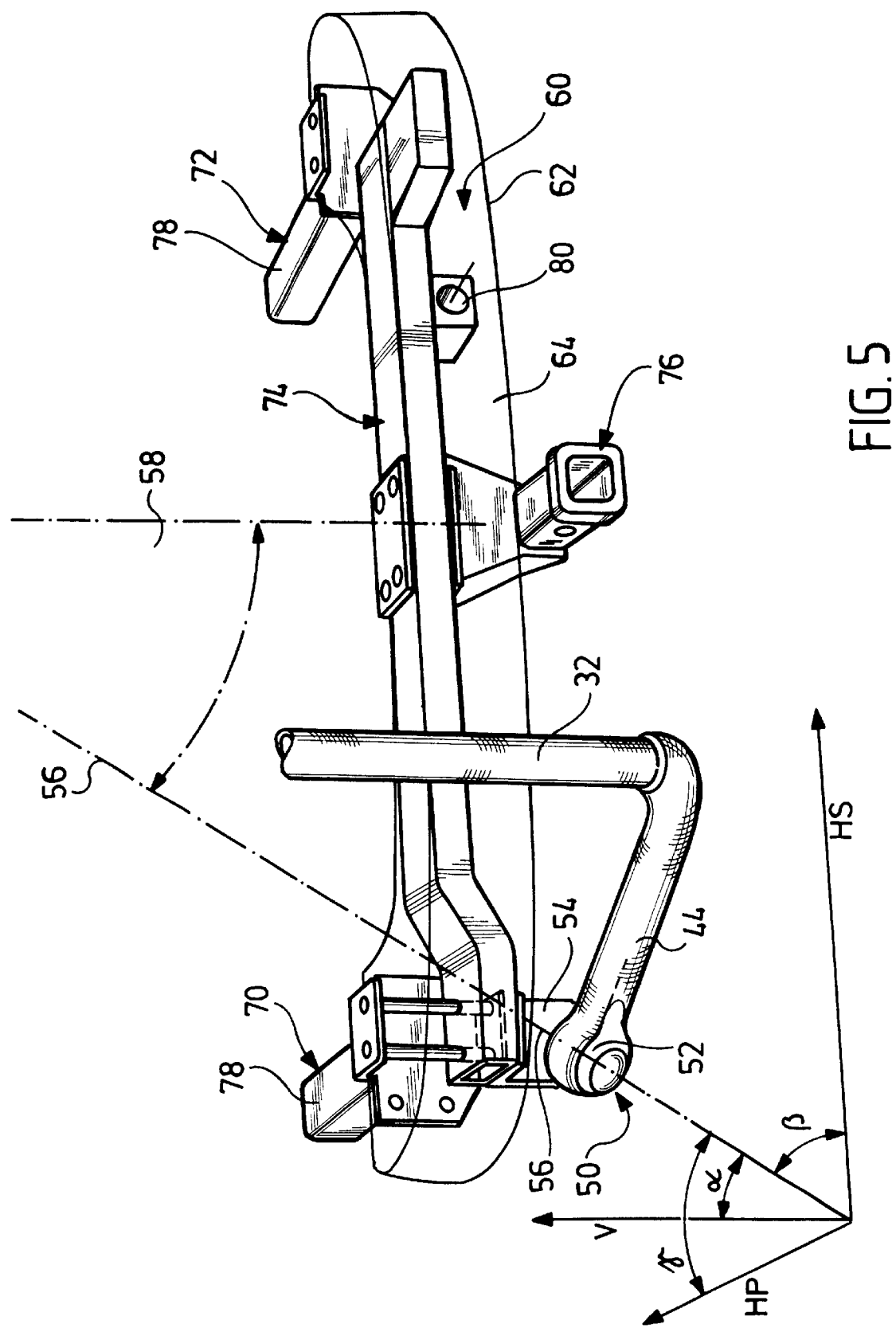
FIG. 5 cut-out view of an arrangement of a swivel bearing and a fixing receiver on a bumper unit in the first embodiment.

Said bearing arm 44 extends towards a swivel bearing denoted as a whole by 50, which, as is shown in FIG. 5, comprises a swivel body 52, which is supported against a bearing body 54 firmly connected to the vehicle body 12 so as to be capable of swivelling about a single swivelling axis 56.

Said swivelling axis 56 extends obliquely relative to a vertical longitudinal centre plane 58 of the vehicle, wherein the swivelling axis 56 includes with a vertical V an angle α, with a horizontal HS perpendicular to the vertical longitudinal centre plane 58 an angle β and with a horizontal HP extending parallel to the vertical longitudinal centre plane 58 an angle γ, wherein all of the angles α, β and γ are acute angles.

The swivelling axis 56 preferably extends in such a way that, the further it extends towards the road surface 42, the greater its distance from the vertical longitudinal centre plane 58.

The swivel bearing 50 is preferably disposed in such a way that it lies below a tail-side bumper unit 60, preferably below a lower edge 62 of the bumper unit 60, wherein the bearing arm 44 extends below the lower edge 62 of the bumper unit 60 to the lateral limb 32 when the spare wheel carrier 30 is in the travel position, which is illustrated in FIG. 1 and in which the spare wheel 40 is aligned approximately parallel to the tail 14 and hence approximately parallel to the closed tailgate 16.

In said case, the bearing body 54 of the swivel bearing 50 is preferably fixed to one of two bumper brackets 70 and 72 which are anchored in the vehicle body 12 at the tail end.

The two bumper brackets are moreover connected to one another preferably by a strut 74, which is covered e.g. by an external body 64.

The strut 74 braces the two bumper brackets 70 and 72 with one another so that all of the forces exerted by the bearing body 54 upon the bumper bracket 70 are also transmitted to the bumper bracket 72 and so ultimately the bearing body 54 acts through both bumper brackets 70 and 72 because of the strut 74 and is therefore anchored in a stable manner to the vehicle body 12.

The strut 74 may preferably be additionally provided with a seat 76, which serves as a seating for further add-on accessories such as, for example, additional tail load carriers, ski racks or a trailer coupling.

The seat receiver 76 preferably lies likewise below a lower edge of the bumper unit 60, i.e. at a side of the bumper unit 60 directed towards the road surface 42.

It is however also conceivable to design the strut 74 simply in such a way that it braces the two bumper brackets 70 and 72 to the extent that the latter are required to be capable of jointly keeping the bearing body 54 stable relative to the vehicle body 12.

It is only in the situation where the strut 74 is additionally loaded by extra forces that the bumper brackets 70 and 72 are designed as reinforced bumper brackets 70 and 72, which are suitable e.g. for the forces of a trailer coupling and extend in each case with an arm 78 into a corresponding recess of the vehicle body 12 and are anchored in the latter.

There is further provided preferably at the strut 74 a fixing seating 80, which is disposed in a fixed manner relative to the vehicle and into which a fixing element 82 held on the fixing arm 46 is insertable and fixable by means of a conventional locking mechanism when the spare wheel carrier 30 is in the travel position, so that in said case the spare wheel carrier 30 is on the one hand held via the bearing arm 44 firmly by the swivel bearing 50 and on the other hand fixed via the fixing arm 46 by the fixing seating 80, which acts upon the fixing element 82, in its travel position relative to the vehicle body 12.

Said fixing seating 80 is preferably covered by the external body 64 of the bumper unit 60 and accessible simply via an opening 84 in the external body 64 of the bumper unit 60.

Figure 3:
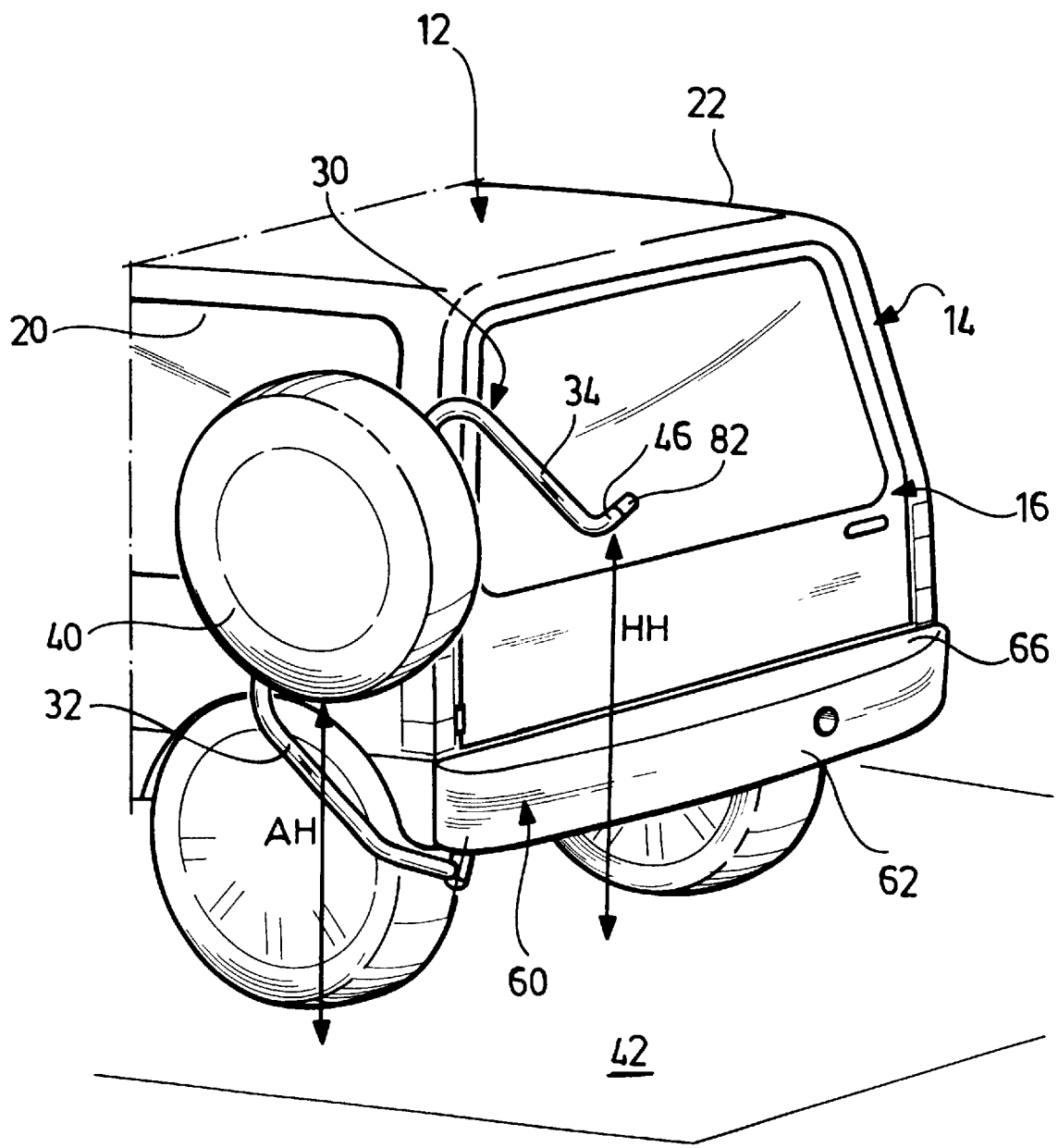
FIG. 3 view of the spare wheel and the spare wheel carrier in the rear access position from the same perspective as in FIG. 1.
Figure 4:
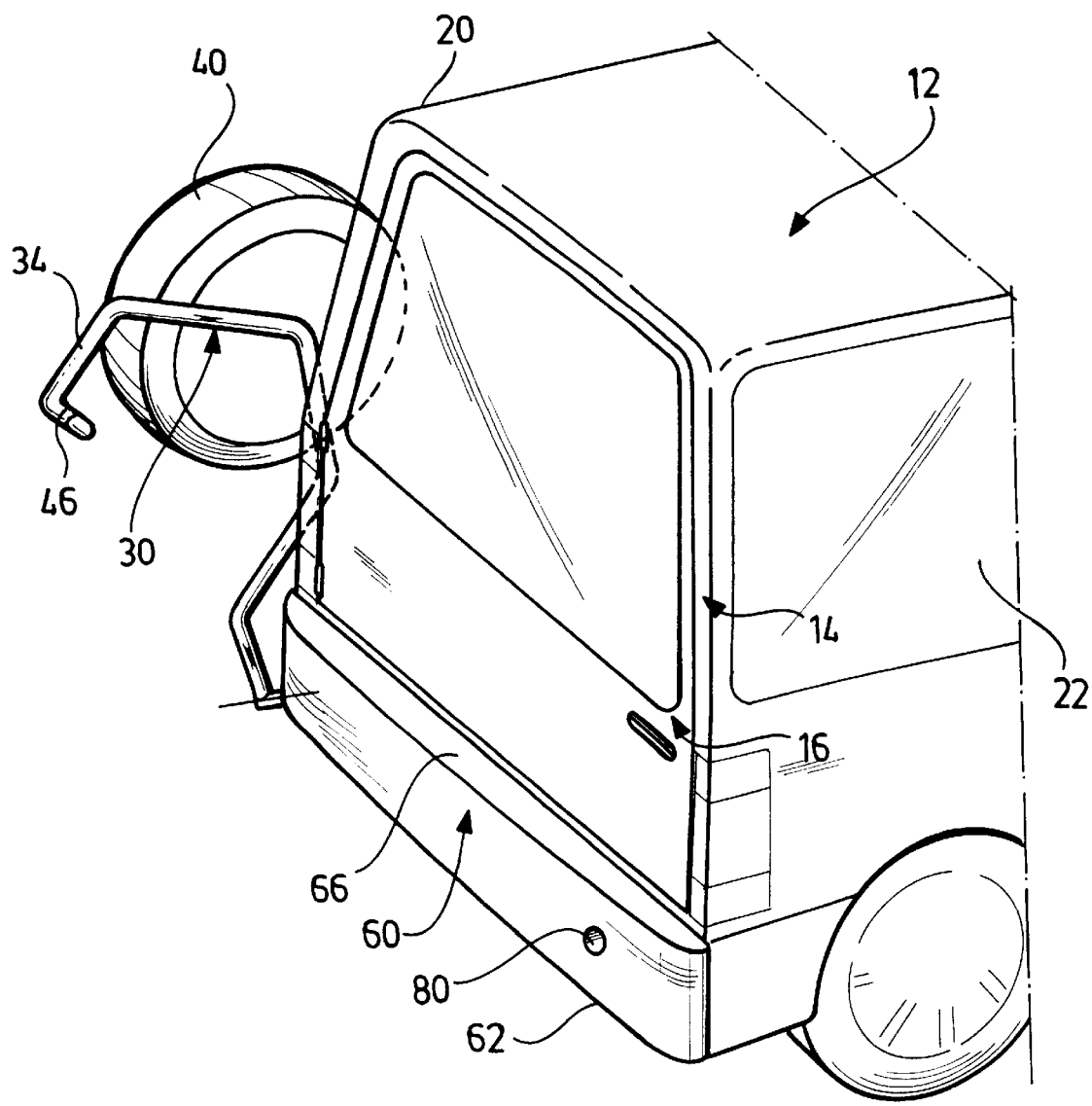
FIG. 4 view similar to FIG. 1 from an opposite side of the vehicle body, wherein the spare wheel and the spare wheel carrier are in a rear access position.

As FIGS. 1 to 4 reveal, starting from the travel position of the spare wheel carrier shown in FIG. 1, after release of the fixing element 82 in the fixing seating 80 the spare wheel carrier 30 may then be swivelled about the swivelling axis 56 in such a way that the fixing arm 46 increasingly distances itself from the bumper unit 60, wherein the spare wheel carrier 30 moves away from its travel position shown in FIG. 1 and extending preferably at right angles to the vertical longitudinal centre plane 58, wherein with progressive swivelling about the swivelling axis 56 a plane extending through the lateral limbs 32 and 34 extends at an ever more acute angle to the vertical longitudinal centre plane 58 until, as is shown in FIGS. 3 and 4, the plane defined by the lateral limbs 32 and 34 extends approximately parallel to the vertical longitudinal centre plane 53, wherein the spare wheel 40 is then disposed in such a way that, as may be seen particularly in FIGS. 3 and 4, it partially overlaps the longitudinal side 20 of the vehicle body 12 disposed nearest to the swivel bearing 50. In said case, the spare wheel 40 may be positioned so that the part-region overlapping the longitudinal side 20 represents only a fraction of the spare wheel 40, which fraction is illustrated by dashes in FIG. 4.

It is however also conceivable to design the swivel bearing 50 in such a way that the part-region overlapping the longitudinal side 20 is more than a third, even better more than half of the spare wheel 40, even better more than two thirds of the spare wheel 40, so that the part-region of the spare wheel 40 projecting rearwards beyond the tail 14 is small.

In the rear access position the spare wheel 40 with the spare wheel carrier 30 is preferably positioned at the driver's side of the vehicle body 12, i.e. in the case of driving on the right, at the left side.

The swivelling axis 56 is preferably designed so as to be inclined spatially and relative to the vertical longitudinal centre plane 58 such that in the travel position a distance AF of the spare wheel 40 from the road surface 42 is smaller than a distance AH of the spare wheel 40 in the rear access position of the spare wheel carrier 30 shown in FIGS. 3 and 4, i.e. the spare wheel 40 during the transition from the travel position shown in FIG. 1 to the rear access position shown in FIGS. 3 and 4 is lifted on account of the orientation of the swivelling axis 56.

At the same time, as is illustrated in FIG. 1 on the one hand and in FIGS. 3 and 4 on the other hand, during the transition of the spare wheel carrier 30 from the travel position shown in FIG. 1 to the rear access position shown in FIGS. 3 and 4 a lifting of the fixing arm 46 relative to the road surface 42 is also effected, with the result that the fixing arm 46 in the travel position is positioned at a height HF above the road surface 42 which is lower than the height HH, at which the fixing arm 46 is positioned in the rear access position of the spare wheel carrier 30.

Conversely, a lowering of the spare wheel 40 is effected in the course of swivelling from the rear access position shown in FIGS. 3 and 4 back into the travel position.

To maintain a stable position of the spare wheel carrier 30 with the spare wheel 40 in the rear access position, on the one hand the swivel bearing 50 is designed in such a way that in the rear access position it is incapable of swivelling any further about the swivelling axis 56 and therefore comprises a stop, which holds the spare wheel 40 in stable alignment relative to the vehicle body 12 and preferably at a defined distance from the longitudinal side 20 of the vehicle body 12, which corresponds at most approximately to the distance of the spare wheel 40 from the tail in the travel position, in order to prevent damage being caused to the vehicle body by the spare wheel carrier 30.

Furthermore, it is preferably provided that the spare wheel 40 in the course of swivelling from the travel position to the rear access position, in terms of its distance A from the road surface 42, passes through a maximum value but in the rear access position is at the distance AH, which is smaller than the maximum distance A of the spare wheel 40 as it travels from the travel position to the rear access position, so that by said means a stable positioning of the spare wheel 40 with the spare wheel carrier 30 is already achieved.

Alternatively, it is however also conceivable to provide, e.g. in the region of the swivel bearing 50, a fixing device for fixing the spare wheel carrier 30 relative to the vehicle body 12 in the rear access position.

Figure 6:
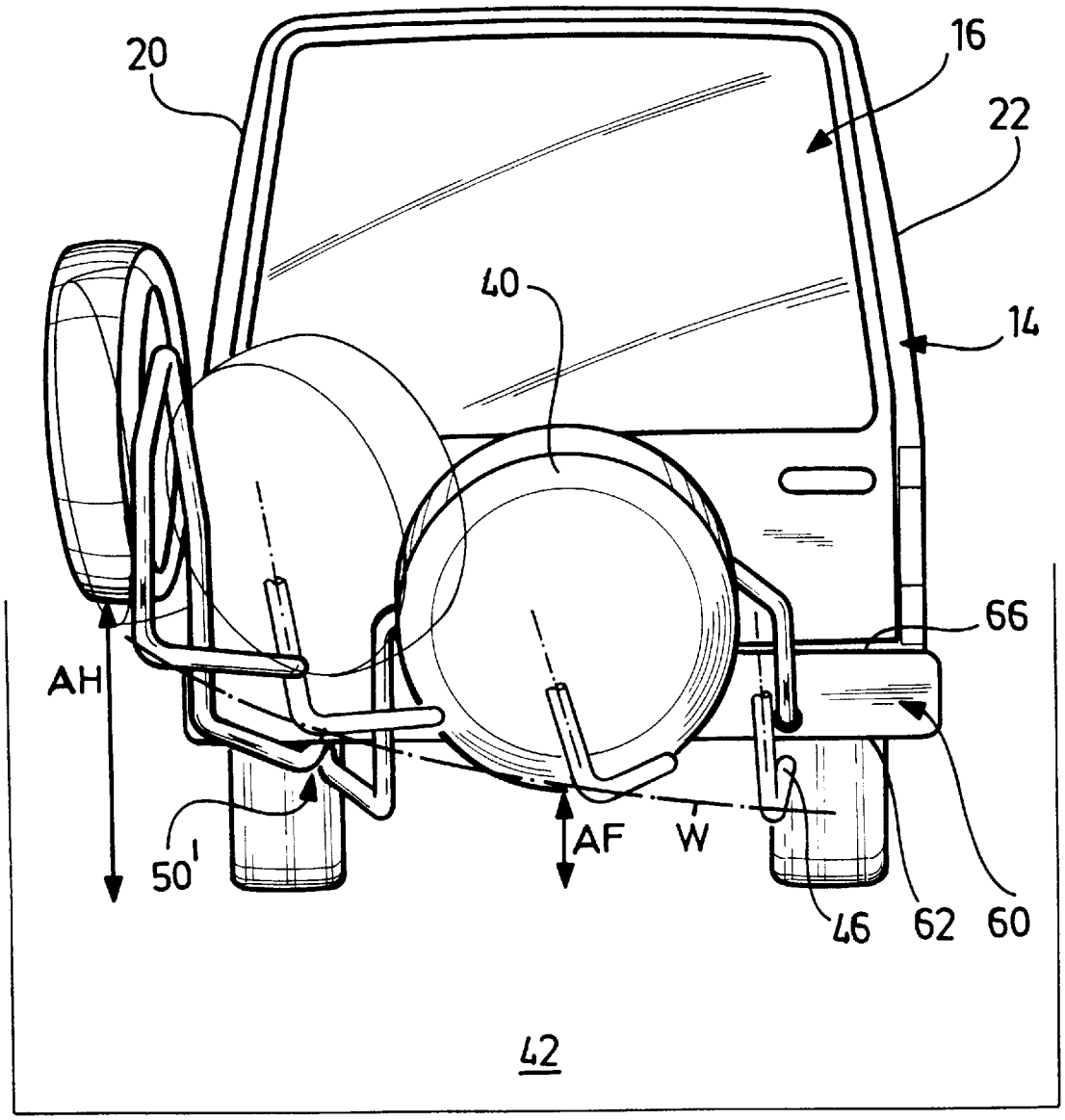
FIG. 6 perspective view of a second embodiment of a spare wheel holding device simultaneously illustrating the travel position, an intermediate position and the rear access position from a viewpoint above and to the rear of a diagrammatically illustrated vehicle body.

In a second embodiment of the spare wheel holding device according to the invention illustrated in FIG. 6, elements which are identical to elements of the first embodiment are provided with the same reference characters so that, with regard to their description, reference may be made in full to the first embodiment.

Unlike the first embodiment, in the second embodiment the swivel bearing 50' is disposed not in a visible manner but integrated in the rear bumper unit 60 so that the swivel bearing 50, whilst lying below an upper edge 66 of the rear bumper unit 60, does not lie below the lower edge 62 of the latter.

It is moreover clearly evident that the fixing arm 46 and hence also the spare wheel 40 in the course of travelling from the travel position to the rear access position move along a path W, which is designed so as to ascend continuously or steadily from the travel position to the rear access position, with the result that in the rear access position the distance AH from the road surface 42 is significantly greater than in the travel position.

What is claimed is:

1. A spare wheel holding device for a vehicle body having a tailgate, comprising:
   a spare wheel carrier adapted to hold a spare wheel and capable of swivelling about an axis relative to the vehicle body,
   the spare wheel carrier being mounted by means of a single swivel bearing so as to be capable of swivelling relative to the vehicle body; and
   the spare wheel in a rear access position being disposed at a greater distance from the road surface than in a travel position.

2. A spare wheel holding device according to claim 1, wherein the spare wheel carrier is supported in the swivel bearing so as to be capable of swivelling only about a single swivelling axis.

3. A spare wheel holding device according to claim 1, wherein the swivel bearing is disposed below an upper edge of a bumper unit.

4. A spare wheel holding device according to claim 3, wherein the swivel bearing is integrated in the bumper unit.

5. A spare wheel holding device according to claim 3, wherein the swivel bearing is seated below a lower edge of the bumper unit.

6. A spare wheel holding device according to claim 1, wherein the swivel bearing is connected to the vehicle body by a holding device provided for a bumper unit.

7. A spare wheel holding device according to claim 6, wherein the swivel bearing is connected to a bumper bracket of the vehicle body.

8. A spare wheel holding device according to claim 7, wherein:
   two bumper brackets are connected to one another by a strut, and
   the swivel bearing is stabilized relative to the vehicle body by means of the strut and the two bumper brackets.

9. A spare wheel holding device according to claim 1, wherein the spare wheel carrier is provided at one side with a bearing arm leading to the swivel bearing.

10. A spare wheel holding device according to claim 3, wherein the spare wheel carrier at an opposite side to the bearing arm has a fixing arm for fixing to the vehicle body in the travel position.

11. A spare wheel holding device according to claim 1, wherein a fixing device is disposed below an upper edge of a bumper unit.

12. A spare wheel holding device according to claim 11, wherein the fixing device is disposed in a region of the bumper unit.

13. A spare wheel holding device according to claim 11, wherein the fixing device comprises a fixing seating, which is disposed in a fixed manner on the vehicle body, and a fixing element held on the spare wheel carrier.

14. A spare wheel holding device according to claim 13, wherein a fixing receiver is connected to the vehicle body by a holding device provided for the bumper unit.

15. A spare wheel holding device for a vehicle body having a tailgate, comprising:
   a spare wheel carrier adapted to hold a spare wheel and capable of swivelling about an axis relative to the vehicle body,
   the spare wheel carrier being mounted by means of a single swivel bearing so as to be capable of swivelling relative to the vehicle body and the swivel bearing has a swivelling axis, which extends obliquely relative to the vertical longitudinal center plane of the vehicle.

16. A spare wheel holding device for a vehicle body having a tailgate, comprising:
   a spare wheel carrier adapted to hold a spare wheel and capable of swivelling about an axis relative to the vehicle body,
   the spare wheel carrier being mounted by means of a single swivel bearing so as to be capable of swivelling relative to the vehicle body and the swivelling axis is oriented at an acute angle ($\alpha$) with respect to vertical.

17. A spare wheel holding device for a vehicle body having a tailgate, comprising:
   a spare wheel carrier adapted to hold a spare wheel and capable of swivelling about an axis relative to the vehicle body,
   the spare wheel carrier being mounted by means of a single swivel bearing so as to be capable of swivelling relative to the vehicle body and the swivelling axis is oriented at an acute angle ($\beta$) with respect to horizontal, which horizontal extends at right angles to a vehicle longitudinal center plane.

18. A spare wheel holding device for a vehicle body having a tailgate, comprising:
   a spare wheel carrier adapted to hold a spare wheel and capable of swivelling about an axis relative to the vehicle body,
   the spare wheel carrier being mounted by means of a single swivel bearing so as to be capable of swivelling relative to the vehicle body and the swivelling axis is oriented at an acute angle ($\gamma$) with respect to horizontal, which horizontal extends parallel to a vertical vehicle longitudinal center plane.

* * * * *

UNITED STATES PATENT AND TRADEMARK OFFICE
CERTIFICATE OF CORRECTION

PATENT NO.    : 6,607,346 B2  
DATED         : August 19, 2003  
INVENTOR(S)   : Dunsch et al.

It is certified that error appears in the above-identified patent and that said Letters Patent is hereby corrected as shown below:

Column 8,
Line 7, change "3" to -- 9 --.

Signed and Sealed this

Twenty-third Day of December, 2003

JAMES E. ROGAN
*Director of the United States Patent and Trademark Office*